(12) United States Patent
Totten et al.

(10) Patent No.: US 10,426,073 B2
(45) Date of Patent: Oct. 1, 2019

(54) ADJUSTABLE LIFT ASSIST FRAME FOR AN AGRICULTURAL IMPLEMENT

(71) Applicant: CNH Industrial America LLC, New Holland, PA (US)

(72) Inventors: Nathaniel Kip Totten, Manheim, PA (US); Cale Nolan Boriack, Lititz, PA (US); Marvin A. Prickel, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 268 days.

(21) Appl. No.: 15/239,513

(22) Filed: Aug. 17, 2016

(65) Prior Publication Data

US 2018/0049362 A1  Feb. 22, 2018

(51) Int. Cl.
| | | |
|---|---|---|
| A01B 63/00 | (2006.01) | |
| A01B 63/14 | (2006.01) | |
| A01B 63/16 | (2006.01) | |
| A01B 63/22 | (2006.01) | |
| A01C 7/08 | (2006.01) | |
| A01C 7/20 | (2006.01) | |

(52) U.S. Cl.
CPC .......... *A01B 63/145* (2013.01); *A01B 63/006* (2013.01); *A01B 63/163* (2013.01); *A01B 63/22* (2013.01); *A01C 7/08* (2013.01); *A01C 7/208* (2013.01)

(58) Field of Classification Search
CPC ... A01B 63/006; A01B 63/026; A01B 63/163; A01B 63/00; A01B 63/002; A01B 63/11; A01B 63/111; A01B 63/114; A01B 63/14; A01B 63/145; A01B 63/16; A01B 63/22

USPC ........................................................ 280/86.5
See application file for complete search history.

(56) References Cited

U.S. PATENT DOCUMENTS

| | | | | |
|---|---|---|---|---|
| 3,090,141 A | * | 5/1963 | Shumaker | E02F 3/841 172/255 |
| 3,870,107 A | * | 3/1975 | Orthman | A01B 63/22 172/260.5 |
| 4,057,111 A | * | 11/1977 | van der Lely | A01B 49/065 111/144 |
| 4,126,189 A | | 11/1978 | Channel | |

(Continued)

FOREIGN PATENT DOCUMENTS

| | | |
|---|---|---|
| BR | PI 0504287-9 A | 5/2007 |
| EP | 0148964 A1 | 7/1985 |

(Continued)

*Primary Examiner* — Matthew Troutman
(74) *Attorney, Agent, or Firm* — Rebecca L. Henkel; Rickard K. DeMille

(57) ABSTRACT

In one embodiment, an agricultural system includes a tool bar configured to couple to a tow vehicle. The tool bar is configured to support at least one row unit assembly. The agricultural system also includes a lift assist assembly coupled to the tool bar such that rotation of the tool bar relative to the lift assist assembly about a vertical axis is blocked. The lift assist assembly is configured to provide lifting support to the tool bar. The lift assist assembly comprises a frame, one or more rolling elements configured to contact a surface of a field, and one or more telescoping members configured to adjust a configuration of the lift assist assembly along at least one of a lateral axis, a longitudinal axis, and the vertical axis.

12 Claims, 7 Drawing Sheets

(56) References Cited

U.S. PATENT DOCUMENTS

| | | | | |
|---|---|---|---|---|
| 4,236,587 A | * | 12/1980 | Shader | E02F 3/7663 172/451 |
| 4,350,222 A | * | 9/1982 | Lutteke | B62D 49/0678 180/209 |
| 4,373,590 A | * | 2/1983 | Wittrock | A01B 33/021 172/103 |
| 4,589,499 A | * | 5/1986 | Behrens | E21B 7/002 173/184 |
| 4,903,781 A | * | 2/1990 | Smit | A01B 63/145 172/316 |
| 5,228,522 A | * | 7/1993 | Stufflebeam | A01B 63/11 172/413 |
| 5,823,629 A | * | 10/1998 | Smith | B60G 9/02 298/23 R |
| 6,032,746 A | * | 3/2000 | Lowery | E02F 3/844 172/445.1 |
| 6,044,916 A | * | 4/2000 | Hundeby | A01B 63/145 172/448 |
| 6,139,045 A | | 10/2000 | Vandenbark et al. | |
| 6,206,125 B1 | * | 3/2001 | Weddle | B60B 35/001 180/209 |
| 6,302,220 B1 | * | 10/2001 | Mayerle | A01B 63/11 172/459 |
| 6,378,619 B2 | * | 4/2002 | Mayerle | A01B 63/11 172/2 |
| 6,827,176 B2 | * | 12/2004 | Bean | B60B 35/003 180/411 |
| 6,892,124 B2 | | 5/2005 | Humpal et al. | |
| 7,163,227 B1 | * | 1/2007 | Burns | B60B 35/1054 180/906 |
| 7,252,169 B2 | * | 8/2007 | McLean | A01B 51/026 180/209 |
| 9,358,836 B2 | * | 6/2016 | David | B60B 35/10 |
| 2002/0020979 A1 | * | 2/2002 | Smith | B62D 61/12 280/86.5 |
| 2009/0194984 A1 | * | 8/2009 | White | B60G 9/02 280/781 |
| 2015/0250089 A1 | | 9/2015 | Hundley et al. | |
| 2016/0081261 A1 | * | 3/2016 | Paulessen | A01B 63/1145 172/195 |
| 2017/0000005 A1 | * | 1/2017 | Totten | A01B 63/22 |

FOREIGN PATENT DOCUMENTS

| | | | |
|---|---|---|---|
| EP | 2030495 A1 | 3/2009 | |
| EP | 2622954 A1 | 8/2013 | |
| FR | 1577163 A | * 8/1969 | ........... A01B 63/026 |
| FR | 2386978 A1 | * 11/1978 | ............ A01B 63/11 |
| WO | 08081112 A2 | 7/2008 | |

* cited by examiner

ADJUSTABLE LIFT ASSIST FRAME FOR AN AGRICULTURAL IMPLEMENT

BACKGROUND

The present disclosure relates generally to agricultural systems and, more particularly, to an adjustable lift assist frame for an agricultural implement.

Certain agricultural implements may be mounted to a tow vehicle and include a lift assist frame coupled to a tool bar of the implement. The lift assist frame may provide assistance in distributing the weight of the implement so as to provide balance to the tow vehicle and/or the implement. This implement may be in the form of a planter or applicator. In the case that the implement is a planter, the implement may include at least one row unit that penetrates soil, deposits seeds, and packs the soil on top of the seeds. It generally is not desirable for rolling elements (e.g., wheels) of the lift assist frame to interact with the rows of seeds that are planted by the row unit. For example, if a wheel of the lift assist frame engages a row of seeds, the wheel may compact the soil, thereby reducing the yield of agricultural product that may emerge from the seeds.

BRIEF DESCRIPTION

In one embodiment, an agricultural system includes a tool bar configured to couple to a tow vehicle. The tool bar is configured to support at least one row unit assembly. The agricultural system also includes a lift assist assembly coupled to the tool bar such that rotation of the tool bar relative to the lift assist assembly about a vertical axis is blocked. The lift assist assembly is configured to provide lifting support to the tool bar. The lift assist assembly comprises a frame, one or more rolling elements configured to contact a surface of a field, and one or more telescoping members configured to adjust a configuration of the lift assist assembly along at least one of a lateral axis, a longitudinal axis, and a vertical axis.

In one embodiment, a lift assist assembly includes a frame, a number of rolling elements, and one or more telescoping members configured to adjust a width of the lift assist assembly along a lateral axis, to adjust a longitudinal distance between the plurality of rolling elements and a tool bar, to adjust a vertical distance between the frame of the lift assist assembly and a field, or some combination there. The lift assist assembly is configured to couple to the tool bar such that rotation of the tool bar relative to the lift assist assembly about a vertical axis is blocked, and the lift assist assembly is configured to provide lifting support to the tool bar.

In one embodiment, a lift assist assembly includes at least one rolling element base including a rolling element and an armature, and a frame coupled to the at least one rolling element base via the armature. The frame includes telescoping members configured to adjust the configuration of the frame. The telescoping members include at least one inner tube disposed within at least one outer tube that enable adjusting the configuration of the frame. Also, the lift assist assembly is configured to provide lifting support to a tool bar.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
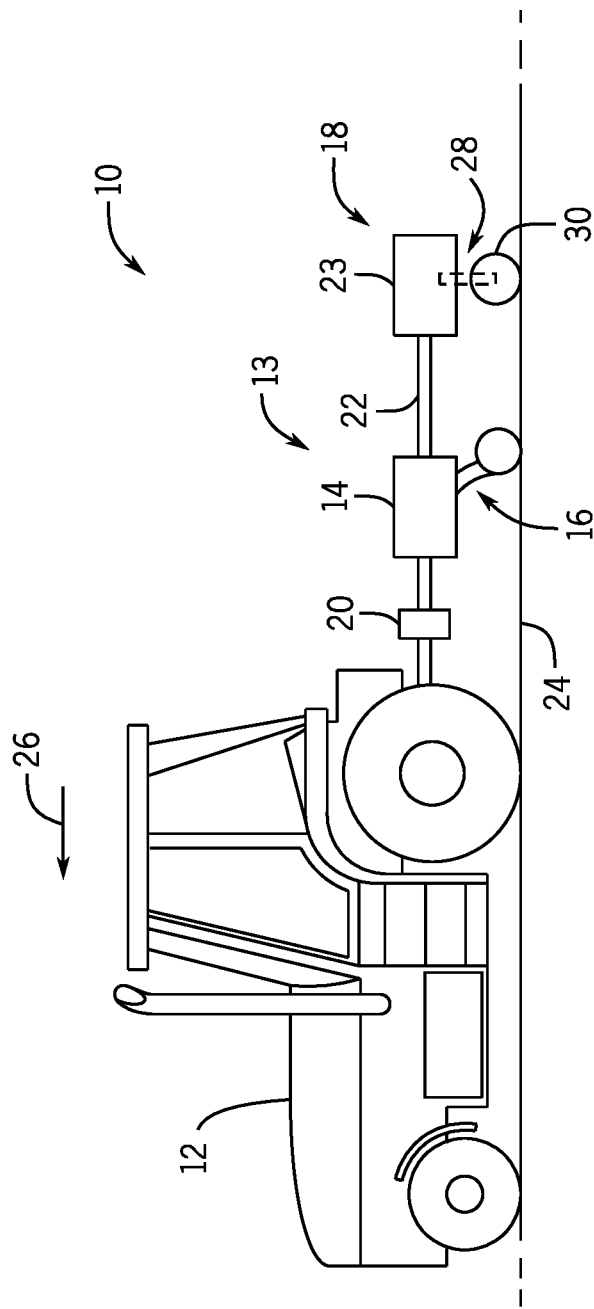
FIG. 1 is a side view of an embodiment of an agricultural system, including a tow vehicle and a mounted implement having a lift assist assembly, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments of the present disclosure generally relate to an enhanced lift assist assembly (e.g., agricultural apparatus)

that may be adjusted in numerous axes to various configurations. In some embodiments, the lift assist assembly includes a frame, a linkage, and one or more rolling element bases including a rolling element (e.g., wheel). Adjusting the lift assist assembly may cause a rolling element (e.g., wheel) attached to the lift assist frame to move relative to the frame. The lift assist assembly may be coupled to a tool bar of an implement, which is mounted to a tow vehicle, via the linkage to distribute the weight of the mounted implement. In some embodiments, the lift assist assembly may be coupled to the tool bar such that rotation of the tool bar relative to the lift assist assembly about a vertical axis is blocked. The frame of the lift assist assembly may be extended or retracted in a lateral axis, a longitudinal axis, a vertical axis, or some combination thereof, to adjust the position(s) of the rolling element(s), e.g., depending on the configuration of the planted rows in a field. The frame of the lift assist assembly may include one or more telescoping members (e.g., tubes, castings, plates, etc.) that enable adjustment of the configuration of the frame, thereby adjusting the position(s) of the rolling element(s) as desired. For example, one or more telescoping members may extend out in a lateral axis so the rolling elements span one or more rows and are positioned between planted rows. The telescoping feature of the frame may enable the rolling elements to be placed between planting rows of different configurations. In this way, the rolling elements may not compact the soil over or near the seeds or plants in the rows of the field.

FIG. 1 is a side view of an embodiment of an agricultural system 10, including a tow vehicle 12 and an implement 13 having a tool bar 14. The implement 13 also includes at least one row unit 16 and a lift assist assembly 18. The row unit(s) 16 and the lift assist assembly 18 are coupled to the tool bar 14. In some embodiments, the lift assist assembly 18 is coupled to the tool bar 14 such that rotation of the tool bar 14 relative to the lift assist assembly 18 about a vertical axis is blocked. As depicted, the tool bar 14 is connected to the tow vehicle 12 via a hitch 20. The tow vehicle 12 may be any vehicle suitable for towing the implement 13, such as a tractor, off-road vehicle, work vehicle, and the like. Additionally, the illustrated row unit 16 may be any device, such as one or more ground engaging implements (e.g., soil conditioner(s), tillage tool(s), fertilizer applicator(s), opening disc(s), seed tube(s), closing disc(s), packer wheel(s), etc.), suitable for agricultural use.

In the illustrated embodiment, the tool bar 14, which supports the row unit(s) 16, is coupled to the tow vehicle 12 via the hitch 20. Although the tool bar 14 is depicted as being attached directly to the hitch 20 of the tow vehicle 12, it should be understood that, in some embodiments, a tow bar frame may connect the tool bar 14 to the hitch 20. Further, the lift assist assembly 18 includes a linkage assembly 22, such as a four bar linkage, that couples to the tool bar 14 and a frame 23 of the lift assist assembly 18. In some embodiments, the linkage assembly 22 may be a single bar, parallel linkage, or rigidly mounted. Also, in some embodiments, the linkage assembly 22 may couple the tool bar 14 and the frame 23 of the lift assist assembly 18. The lift assist assembly 18 may be coupled to the tool bar 14 such that rotation of the tool bar 14 relative to the lift assist assembly 18 about a vertical axis is blocked. The linkage assembly 22 may include one or more force actuators such as hydraulic cylinders that provide a lifting force to adjust the frame 23 in a vertical and/or a lateral axis, thereby controlling the weight supported by the lift assist assembly 18. The agricultural system 10 travels over a surface 24, such as a road, a field, or another surface. The tow vehicle 12 is configured to move the row unit 16 in a direction of travel 26 over the surface 24.

The lift assist assembly 18 includes at least one rolling element base 28 that includes rolling elements 30 (e.g., wheels). In some embodiments, the lift assist assembly 18 includes two rolling element bases 28. The lift assist assembly 18 may include telescoping members to adjust the configuration of the rolling element base 28 and/or the height of the frame 23 above the field 24. The configuration of planting rows may vary within the field 24 and/or between fields. For example, certain rows may be wider or narrower than other rows. As such, using telescoping members, the lift assist assembly 18 may adjust the configuration of the rolling element base 28 so the rolling elements 30 are positioned between the rows to avoid compacting the soil above and/or near the seed(s) or plant(s) of each row. In some embodiments, the configuration of the lift assist assembly 18 may be adjusted electronically via a controller (e.g., included on the tow vehicle 12, the tool bar 14, or the lift assist assembly 18). The controller may communicate with a valve assembly that controls fluid flow to one or more hydraulic cylinders included on the linkage 22 and/or the lift assist assembly 18. The controller may include a processor and a memory that includes computer instructions executable by the processor. The computer instructions may control when and to what extent to actuate the hydraulic cylinders to cause the configuration of the lift assist assembly 18 to adjust in real-time or near real-time.

For example, in some embodiments, the memory may store a map of the field 24 and the processor may determine the width, spacing, and/or position of the rows in the field 24 based on the map. Additionally, the tow vehicle 12 may include one or more sensors that sense objects (e.g., crops or plants) proximate to the tow vehicle 12 and/or the lift assist assembly 18. The sensors may enable the processor to determine the height of a certain object in front of the tow vehicle 12, such as the height of crops in the row. Further, the tow vehicle 12 may include a global positioning system (GPS) in communication with the controller that is used to determine the position of the tow vehicle 12 in the field 24. Using the determined widths of the rows, the heights of certain objects in the field 24, and the position of the tow vehicle 12, the controller may transmit control signals to the hydraulic cylinders to adjust the configuration of the frame 23 so the rolling elements 30 are positioned between the rows and/or the frame 23 is positioned above the objects in the row as the agricultural system 10 traverses the rows in the field 24.

Additionally or alternatively, the telescoping members of the lift assist assembly 18 may be adjusted manually to modify the configuration of the frame 23. For example, depending on the configuration of the rows, the operator of the agricultural system 10 may manually adjust the width of the frame 23 and/or the height of the frame 23 above the field 24 prior to driving the tow vehicle 12 across each row in the field 24. For example, the frame 23 of the lift assist assembly 18 may include pins that are positioned in different openings to manually adjustable to various lengths. The pins may be manually depressed by the operator to move the pins between the openings to adjust the configuration of the frame 23, thereby increasing/decreasing the width and/or height of the frame 23. Further, it should be noted that, while hydraulic actuators are described herein, any suitable actuator may be used, such as electric, mechanical, pneumatic, or the like.

Figure 2A:
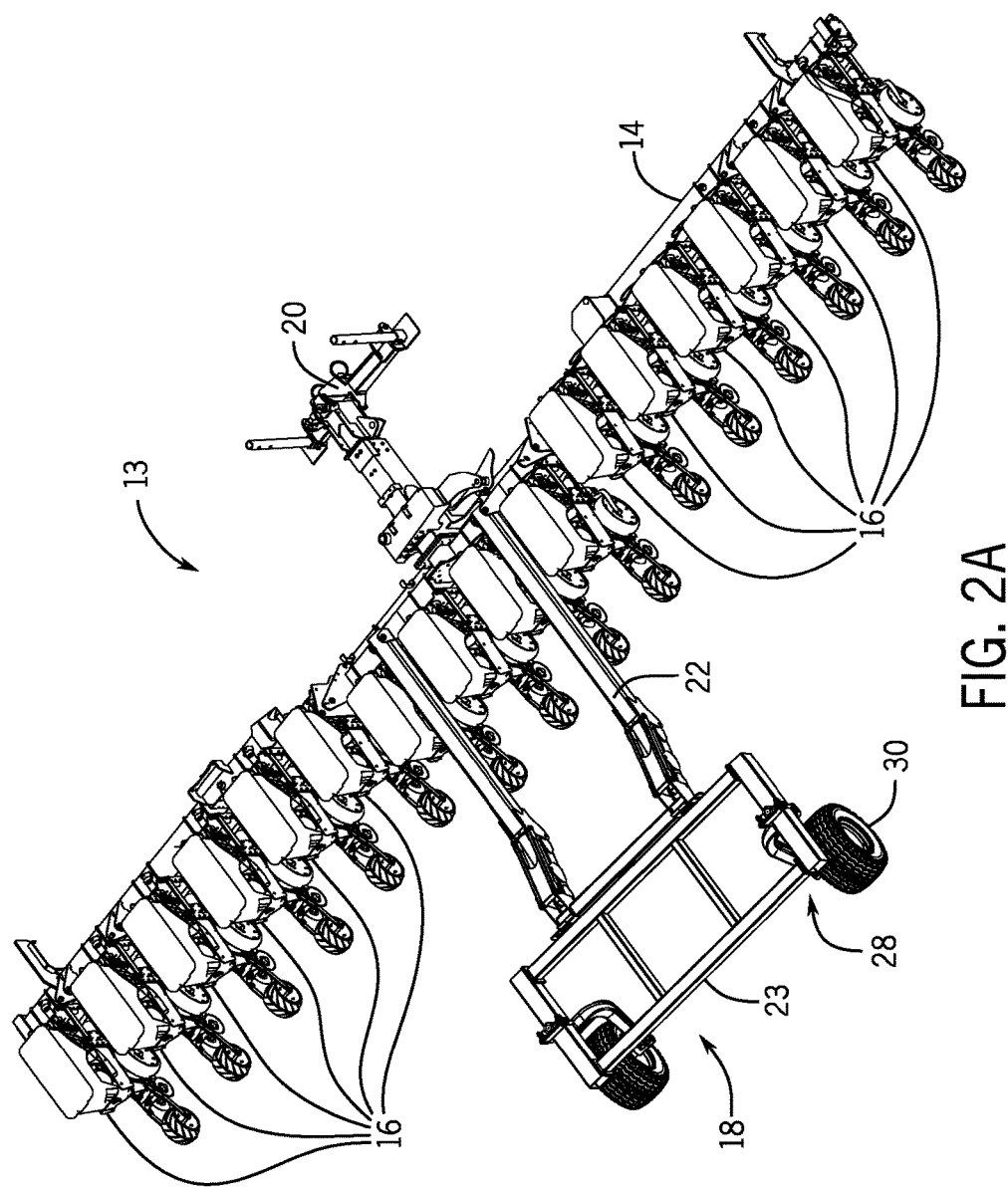
FIG. 2A is a perspective view of a mounted implement having an example of a lift assist assembly, in accordance with an embodiment.

FIG. 2A is a perspective view of the mounted implement 13 having an example of the lift assist assembly 18, in accordance with an embodiment. Each of the row units 16 mounted on the tool bar 14 may include a down force element to establish a contact force between ground engaging elements of the row unit 16 and the soil. The down force element is configured to apply a force to the row unit 16 in a downward direction, thereby driving at least one ground engaging tool of the row unit 16 into the soil. As will be appreciated, a desired level of down force may vary based on soil type, the degree of tillage applied to the soil, soil moisture content, amount of residue cover, and/or tool wear, among other factors. Because such factors may vary from one side of the tool bar 14 to the other, a different level of down force may be selected for each row unit 16 to establish a substantially uniform seed deposition depth throughout the field 24.

Each row unit 16 may include a frame that is configured to support various elements, such as a metering system, a product storage container, an opener assembly, a soil closing assembly, a press assembly, and/or a residue manager assembly. The opener assembly may include a gauge wheel assembly having a gauge wheel and a rotatable arm which movably couples the gauge wheel to the frame. The gauge wheel may be positioned a vertical distance above an opener disk to establish a desired trench depth for seed deposition into the soil. As the row unit 16 travels across the field, the opener disk excavates a trench into the soil, and seeds or other agricultural products are deposited into the trench. The opener assembly may also include a depth control cylinder extending between the chassis and the rotatable arm of the gauge wheel assembly.

As will be appreciated, seeds or other agricultural products may be deposited within the excavated trench via a seed tube extending between a metering system, which may be mounted on the frame of the row unit 16, and the soil. The seed tube exit may be positioned aft of the opener assembly and forward of the closing assembly such that seeds or other agricultural products flow into the trench. Closing disks of the closing assembly push the excavated soil into the trench, thereby closing the trench. The closing assembly may include an arm extending between the frame and the closing disk. A closing disk cylinder may be coupled to the arm of the closing assembly and configured to regulate a contact force between the closing disk and the soil. For example, a large contact force may be applied to effectively push dense soil into the trench, while a relatively small contact force may be applied to close a trench within loose soil.

A press wheel of the press wheel assembly may be positioned aft of the closing assembly to pack soil on top of the deposited seeds. The row units 16 may be spaced apart a configurable distance from each other to enable planting seeds in rows of various spacings (e.g., 20-inch spacing, 30-inch spacing, etc.). The total weight of the row units 16 may be substantial and may induce a significant downward force on the tool bar 14. Thus, to distribute the weight of the row units 16 and/or provide lifting support to the tool bar 14, the lift assist assembly 18 may be connected to the tool bar 14 via the linkage assembly 22. As previously noted, the lift assist assembly 18 includes the rolling element bases 28 that include rolling elements 30 (e.g., wheels).

Figure 2B:
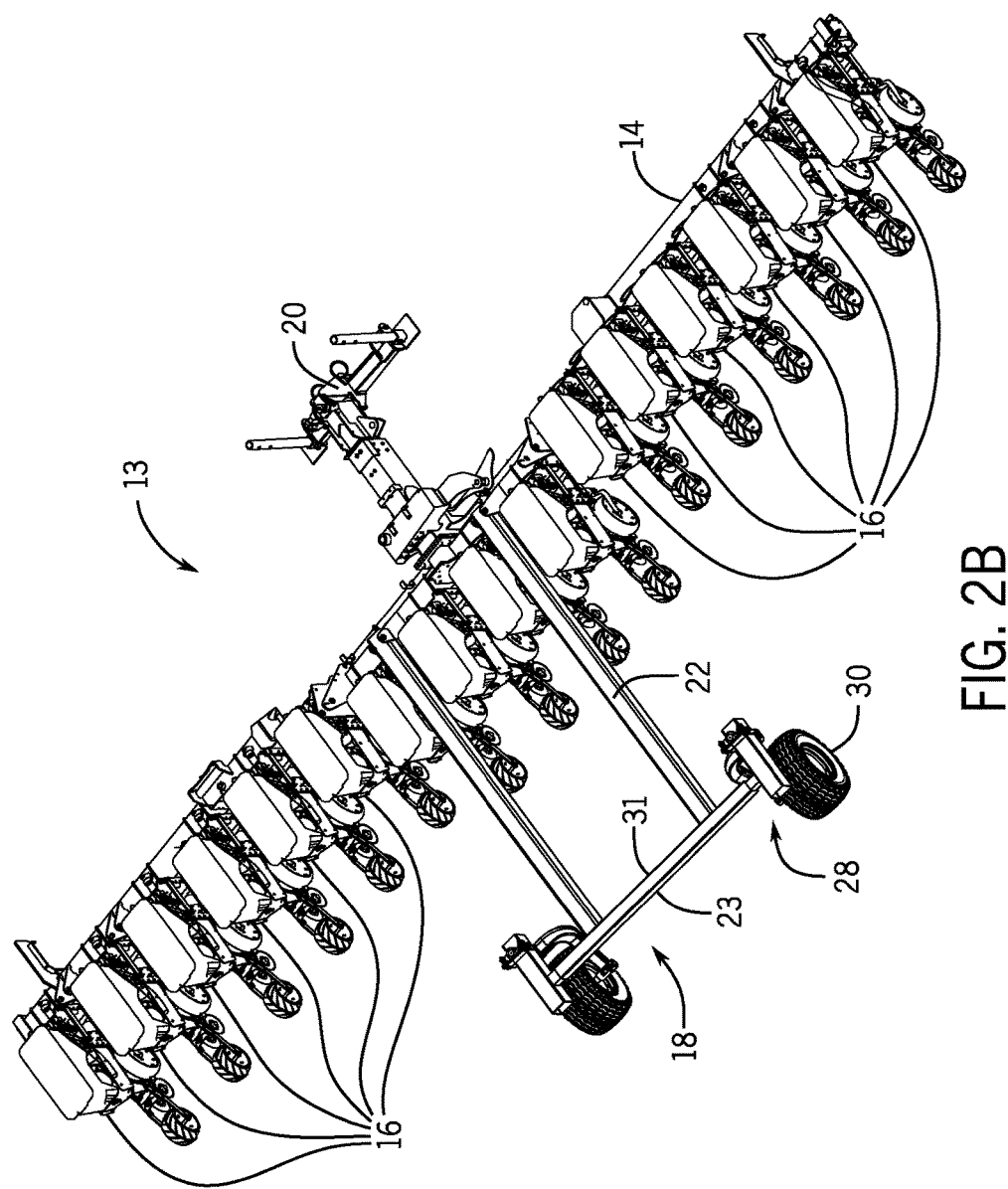
FIG. 2B is a perspective view of the mounted implement of FIG. 2A having another example of the lift assist assembly, in accordance with an embodiment.

Further, in the depicted embodiment, the frame 23 of the lift assist assembly 18 includes dual cross members (e.g., bars) 31. However, FIG. 2B is a perspective view of the mounted implement 13 having another example of the lift assist assembly 18 that includes a frame 23 with a single cross member 31. It should be understood, that any suitable number of cross members 31 may be included in the frame 23.

It may be undesirable for the rolling elements 30 to compact the soil in the rows where the seeds are deposited. Thus, some benefits of the present disclosure enable adjusting the configuration of the rolling element base 28 such that the rolling elements 30 are positioned between planting rows of different configurations.

Figure 3A:
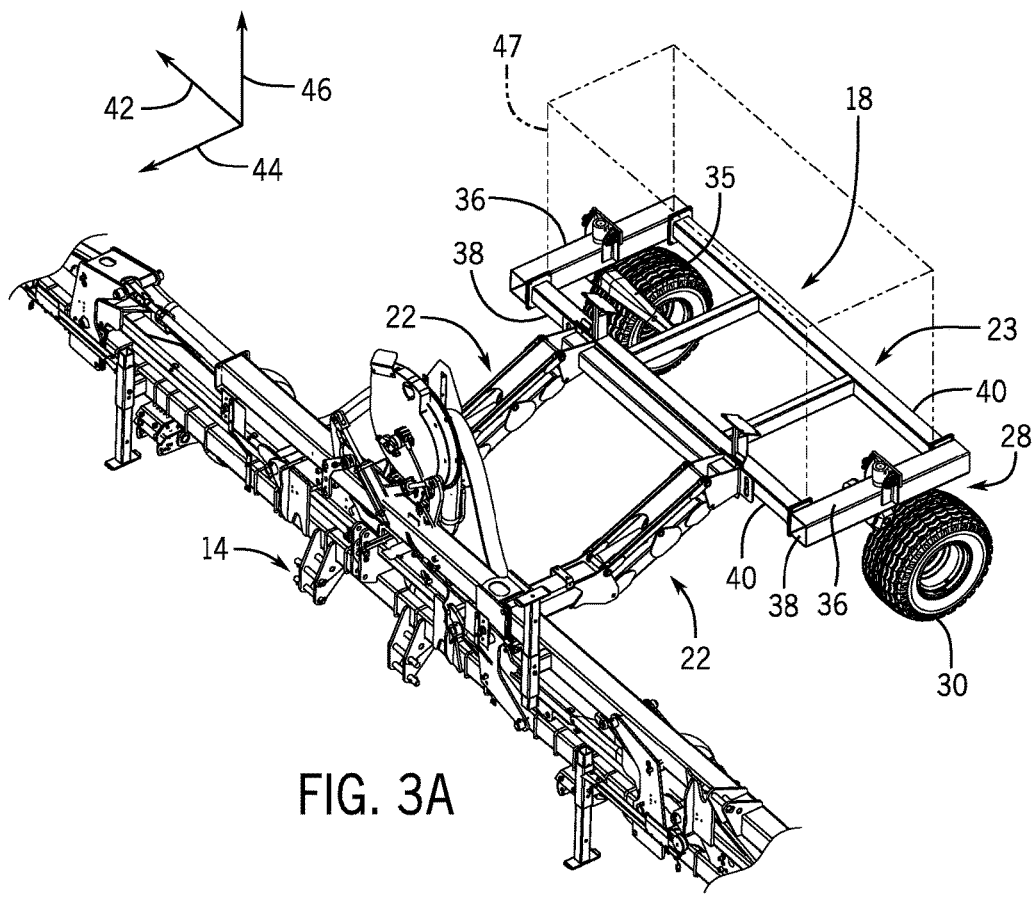
FIG. 3A is a perspective view of a tool bar and a lift assist assembly that may be employed on the mounted implement of FIG. 2A, in accordance with an embodiment.

FIG. 3A is a perspective view of the tool bar 14 and the lift assist assembly 18, in accordance with an embodiment. As previously discussed, the lift assist assembly 18 includes the frame 23, the linkage assembly 22 (e.g., four bar linkage), and two rolling element bases 28. As depicted, the frame 23 is connected to the tool bar 14 via the linkage assembly 22 (e.g., four bar linkage). Each rolling element base 28 includes an armature 35 that connects to the rolling element 30 (e.g., wheel) and to the frame 23. In some embodiments, the rolling elements 30 may include tracks, fixed wheels, or caster wheels. In the depicted embodiment, the armature 35 of each rolling element base 28 is connected to a respective telescoping member 36 of the frame 23. In the illustrated embodiment, the telescoping members 36 include an inner tube 38 disposed within an outer tube 40 of the frame 23. However, in alternative embodiments, the telescoping members 36 may include any suitable members that enable telescopic movement, such as castings, plates, or the like. The telescoping members 36 may be moved hydraulically, mechanically, and/or pneumatically.

Figure 3B:
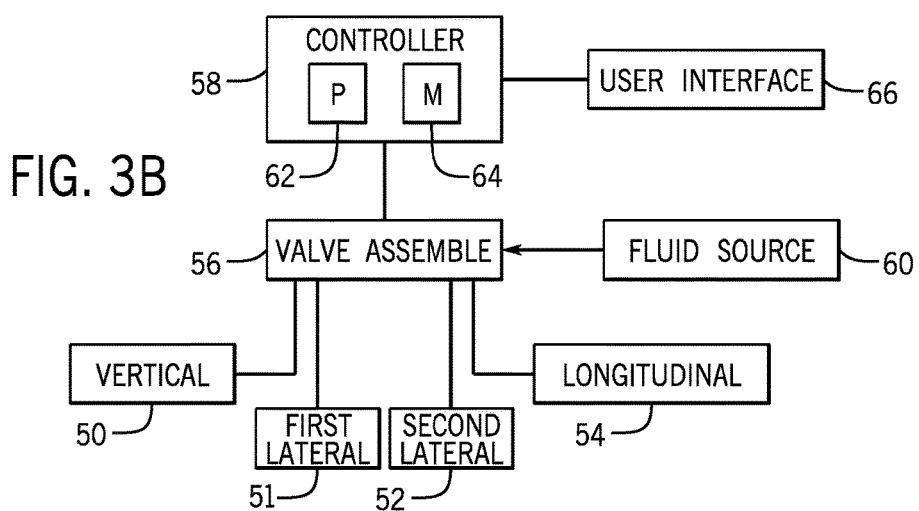
FIG. 3B is a block diagram of a controller communicatively coupled to a valve assembly to control a vertical hydraulic cylinder, lateral hydraulic cylinder, and/or longitudinal hydraulic cylinder, in accordance with an embodiment.

Accordingly, in some embodiments, the lift assist assembly 18 may include one or more actuating cylinders (e.g., vertical hydraulic cylinder 50, first lateral hydraulic cylinder 51, second lateral hydraulic cylinder 52, and/or longitudinal hydraulic cylinder 54) controlled by a valve assembly 56 communicatively coupled to a controller 58, as shown in FIG. 3B. The controller 58 may transmit control signals to the valve assembly 56 to control a flow of hydraulic fluid from a fluid source 60 to the hydraulic cylinder(s) 50, 51, 52, and/or 54, thereby inducing the hydraulic cylinder(s) 50, 51, 52, and/or 54 to extend to adjust the frame 23. For example, supplying hydraulic fluid to the first and/or second lateral hydraulic cylinders 51 and/or 52 may cause the hydraulic cylinder 51 and/or 52 to increase the width of the frame 23 along a lateral axis 42 (i.e., increasing the spacing between the rolling elements 30 in the lateral axis 42). As a result, the frame 23 may be extended along the lateral axis 42 to span a number of rows of a field 24 (e.g., 1, 2, 3, 4, or more), and the rolling elements 30 may be positioned in between the rows. Further, the controller 58 may send control signals to the valve assembly 56 to control the flow of hydraulic fluid to the first and/or second lateral hydraulic cylinders 51 and/or 52 to retract the telescoping members 36 so the width of the frame 23 is reduced. In addition, the controller 58 may send control signals to the valve assembly 56 to control the flow of hydraulic fluid to the lateral hydraulic cylinders 51 and/or 52 to adjust the position of the lift assist assembly 18 along the lateral axis in relation to the tool bar 14 with or without adjusting the width between the rolling elements 30. That is, the first lateral hydraulic cylinder 51 and the second lateral hydraulic cylinder 52 may be controlled independently. For example, the hydraulic fluid may be provided to the first lateral hydraulic cylinder 51 to cause the telescoping members 36 on a first side of the lift assist assembly 18 to extend and hydraulic fluid may be drained from the second lateral hydraulic cylinder 52 to cause the telescoping members 36 on a second side of the lift assist assembly 18 to retract. As a result, the lift assist assembly 18 may be moved leftwards, which may be beneficial to guide the lift assist assembly 18 between rows when the tow vehicle 12 performs a turn.

The controller 58 may include a processor 62 and a memory 64. The processor 58 may be any type of computer processor or microprocessor capable of executing computer-executable code. Moreover, the processor 58 may include multiple processors or microprocessors, one or more "general-purpose" processors or microprocessors, one or more special-purpose processors or microprocessors, and/or one or more application specific integrated circuits (ASICS), or some combination thereof. For example, the processor 58 may include one or more reduced instruction set (RISC) processors.

The memory 64 may be one or more tangible, non-transitory computer-readable media (e.g., any suitable form of memory or storage). It should be noted that non-transitory merely indicates that the media is tangible and not a signal. The memory 64 may be any suitable articles of manufacture that can serve as media to store processor-executable routines, code, data, or the like used by the processor 58 to perform the presently disclosed techniques. For example, the memory 64 may include volatile memory (e.g., a random access memory (RAM)), nonvolatile memory (e.g., a read-only memory (ROM)), flash memory, a hard drive, or any other suitable optical, magnetic, or solid-state storage medium, or a combination thereof. The memory 64 may also be used to store any data, analysis of the data, and the like.

Generally, the processor 62 may execute instructions accessed from the memory 64 that send control signals to the valve assembly 56 to control the flow of fluid to the hydraulic cylinders 50, 52, and/or 54. In some embodiments, the processor 62 may execute instructions that implement and provide a user interface 66 that enables the user to control how the valve assembly 56 provides fluid to the hydraulic cylinders 50, 51, 52, and/or 54. For example, the user may use the user interface 66 displayed on a display to actuate the vertical hydraulic cylinder 50 to raise the height of the frame 23 from the ground surface along a vertical axis 46, to actuate the lateral hydraulic cylinders 51 and/or 52 to extend the width of the frame 23 along a lateral axis 42, and/or to actuate the longitudinal hydraulic cylinder 54 to increase the length of the frame 23 along a longitudinal axis 44.

Additionally or alternatively, returning to FIG. 3A, the telescoping members 36 may be manually extended by an operator. For example, the operator may remove one or more pins that block lateral movement of the inner tubes 38 relative to the outer tubes 40, extend the inner tubes 38 in the laterally outward axis 42, and reinsert the pin in the outer tube 40 and the inner tubes 38 to secure the telescoping members 36 in their new positions. Although the depicted embodiment includes telescoping members 36 oriented to enable lateral telescoping movement, it should be noted that the telescoping members 36 may be oriented to enable longitudinal movement and/or vertical movement, as discussed in further detail below. In some embodiments, additional telescoping members 36 may be used to provide movement in the longitudinal and vertical axes 44 and 46. The additional telescoping members 36 that provide movement in the longitudinal axis 44 and/or the vertical axis 46 may be manual or powered. The telescoping members 36 may be integrated with the frame 23 or attached to the frame 23. Further, in some embodiments, the lift assist assembly 18 may support one or more of bulk fill, fertilizer, ballast, and chemical tanks 47. Also, the lift assist assembly 18 may support certain objects (e.g., cement blocks, sandbags, etc.) that provide additional weight to the lift assist assembly 18 to aid in balancing the tool bar 14 (e.g., reducing the load on the hitch). Further, as depicted, in some embodiments, the lift assist assembly 18 may not support any additional objects.

Figure 4A:
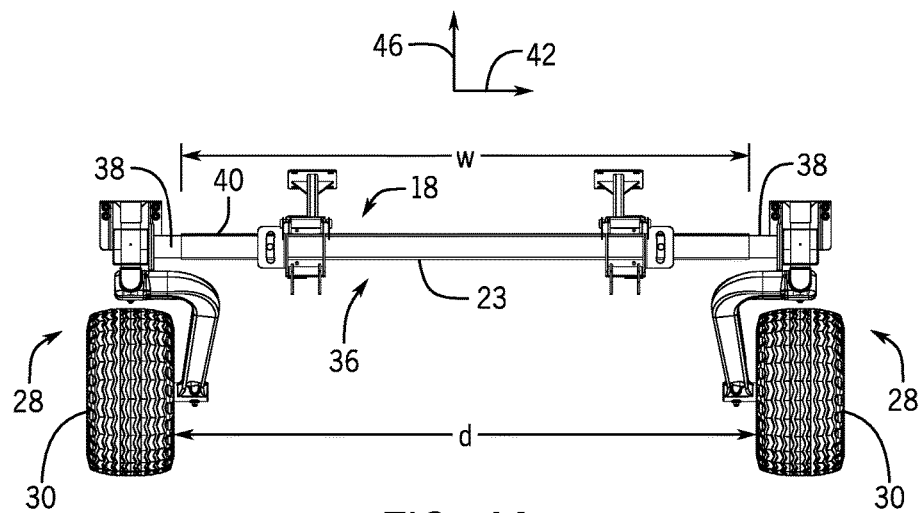
FIG. 4A is a rear view of the lift assist assembly of FIG. 3A in a laterally retracted configuration, in accordance with an embodiment.

FIG. 4A is a rear view of the lift assist assembly 18 of FIG. 3A telescoped in a laterally retracted position, in accordance with an embodiment. It should be noted that the inner tubes 38 and the outer tubes 40 may be referred to as a "set of telescoping members" herein. As depicted, the inner tubes 38 are fully retracted into the outer tubes 40. As a result, the distance d between the rolling elements 30 is reduced. The distance d between the rolling elements 30 may be based on the width w of the outer tube 40, the configuration of the rolling element bases 28, and/or the configuration of the frame 23, among other things. Reducing the width of the frame 23 may be useful for narrow rows in the field 24 (e.g., 20-inch row spacing, etc.). The telescoping members 36 may be moved hydraulically (e.g., by the one or more hydraulic cylinders in response to control signals from a controller), pneumatically, or manually, as discussed above. Further, although the telescoping members 36 include the inner tubes 38 in the illustrated embodiment, any suitable members may be used that enable telescopic movement, such as castings, plates, or the like. In addition, telescoping members 36 that provide movement in the lateral axis 42 are depicted as being located in the front and the back of the frame 23 (e.g., two sets of telescoping members 36). However, it should be understood that some embodiments of the frame 23 may include just one set of telescoping members 36, three sets of telescoping members 36, or more sets of telescoping members 36.

Figure 4B:
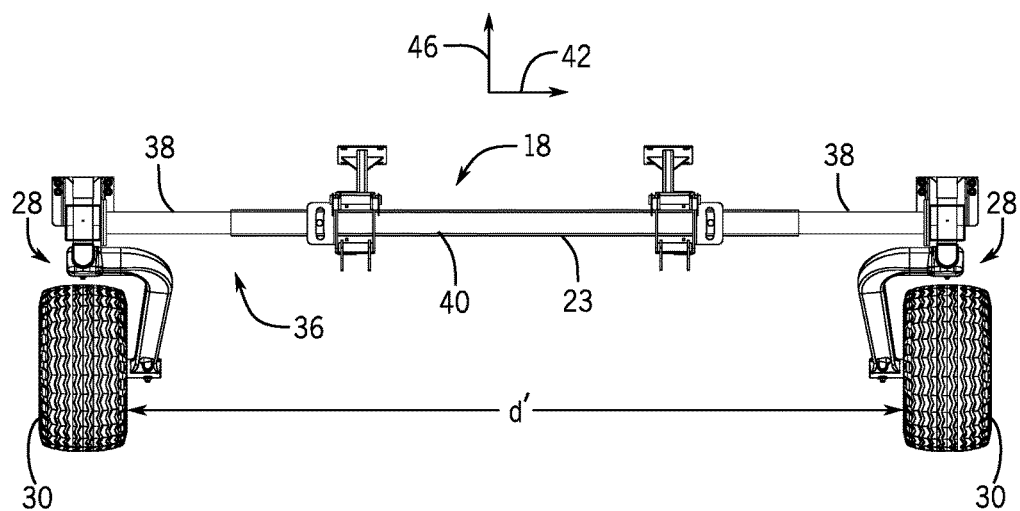
FIG. 4B is a rear view of the lift assist assembly of FIG. 3A in a laterally extended configuration, in accordance with an embodiment.

FIG. 4B is a rear view of the lift assist assembly 18 of FIG. 3A telescoped in a laterally extended position, in accordance with an embodiment. As depicted, the left inner tube 38 is extended outwardly from the outer tube 40 in the lateral axis 42 and the right inner tube 38 is extended outwardly from the outer tube 40 in the lateral axis 42. The telescoping members 36 may be telescoped out hydraulically (e.g., by the one or more hydraulic cylinders in response to control signals from the controller), pneumatically, or manually, as discussed above. As a result, the distance d' between the rolling element elements 30 is increased to enable the rolling elements 30 to be positioned between rows with increased widths (e.g., 30-inch row spacing, etc.) and/or to span numerous rows. As may be appreciated, the distance between the rolling elements 30 may be any suitable amount from the distance in which the inner tubes 38 are fully extended to the distance in which the inner tubes 38 are fully retracted. It should be understood that the minimum distance between the rolling elements 30 is based on the width w of the outer tube 40, and the maximum distance between the rolling elements 30 is based on the width w of the outer tubes 40 and the width of the inner tubes 38. Further, it should be noted that the positions of the inner tubes 38 and the outer tubes 40 may be swapped in some embodiments.

Figure 5A:
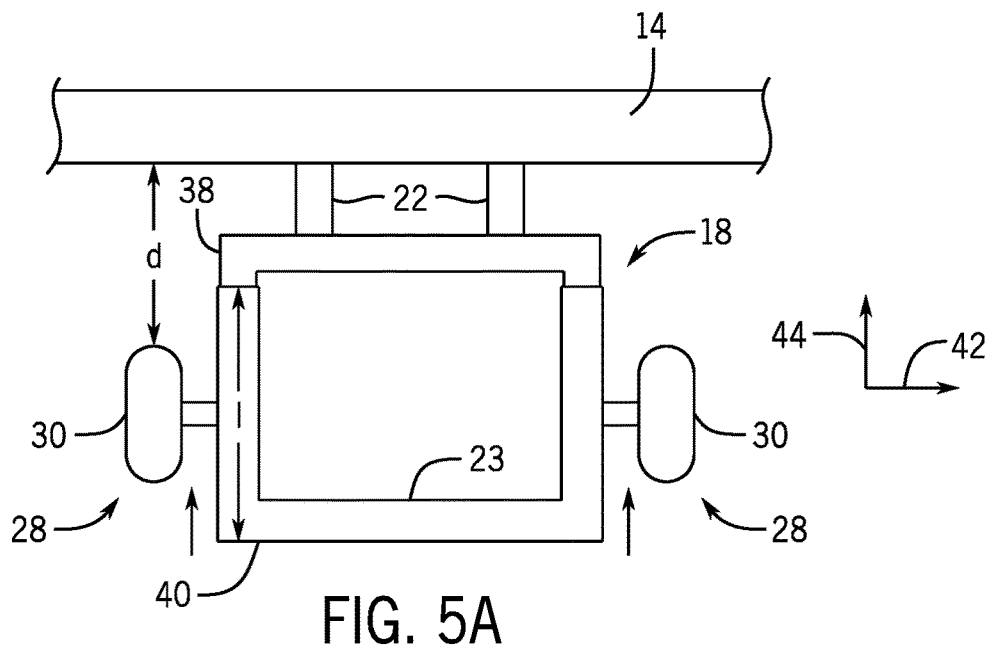
FIG. 5A is a top view of a lift assist assembly in a longitudinally retracted configuration, in accordance with an embodiment.

FIG. 5A is a top view of a lift assist assembly 18 telescoped in a longitudinally retracted position, in accordance with an embodiment. As depicted, the inner tube 38 is fully retracted into the outer tubes 40 so the distance d between the rolling elements 30 of the rolling elements 30 and the tool bar 14 is reduced. The minimum distance d between the rolling elements 30 and the tool bar 14 may be based on the length l of the outer tubes 40, the configuration of the rolling element bases 28, and/or the configuration of the frame 23, among other things. It should be understood that the position of the inner tubes 38 and the outer tubes 40 may be swapped in some embodiments. The telescoping members 36 may be telescoped in hydraulically (e.g., by the one or more hydraulic cylinders in response to control signals from the controller), pneumatically, or manually, as discussed above. Moving the rolling elements 30 closer to the tool bar 14 may provide enhanced lifting assistance by distributing more of the weight of the row units 16 on the tool bar 14 to the lift assist frame 18. Further, although the telescoping members 36 are shown as using tubing, any suitable members may be used that enable telescopic movement, such as castings, plates, or the like.

Figure 5B:
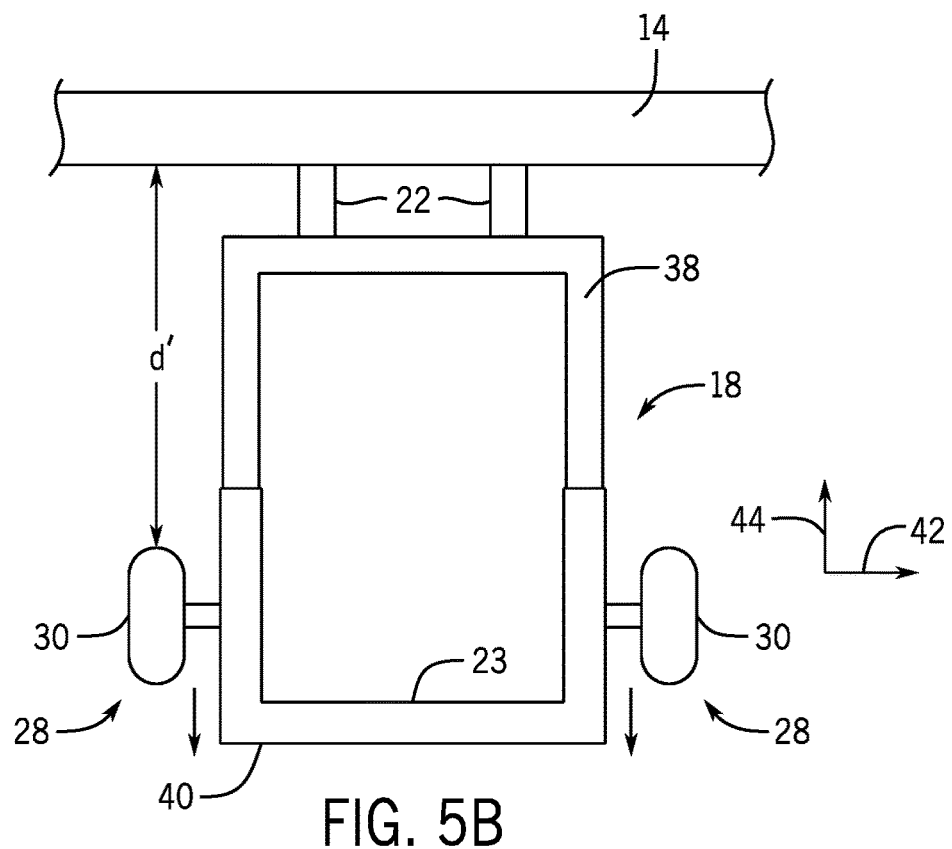
FIG. 5B is a top view of the lift assist assembly of FIG. 5A in a longitudinally extended configuration, in accordance with an embodiment.

FIG. 5B is a top view of the lift assist assembly 18 of FIG. 5A telescoped in a longitudinal extended position, in accordance with an embodiment. As depicted, the inner tube 38 is extended outward from the outer tubes 40 along the longitudinal axis 44. The telescoping members 36 may be telescoped out hydraulically (e.g., by the one or more hydraulic cylinders in response to control signals from a controller), pneumatically, or manually, as discussed above. As a result, the distance d' between the rolling elements 30 and the tool bar 14 is increased. The maximum distance between the rolling elements 30 and the tool bar 14 may be based on the length l of the outer tubes 40 and the length of the inner tubes 38, the configuration of the rolling element bases 28, and/or the configuration of the frame 23. It should be noted that although the distance between the rolling elements 30 is shown as remaining constant between FIGS. 5A and 5B, the distance may be adjusted when using telescoping members 36 that adjust the width of the lift assist assembly 18 in the lateral axis 42, as discussed above with regard to FIGS. 4A and 4B. As may be appreciated, the distance between the rolling elements 30 and the tool bar 14 may be any suitable distance (e.g., from the distance in which the inner tube 38 is fully extended from the outer tube 40 to the distance in which the inner tube 38 is fully retracted in the outer tube 40).

Figure 6A:
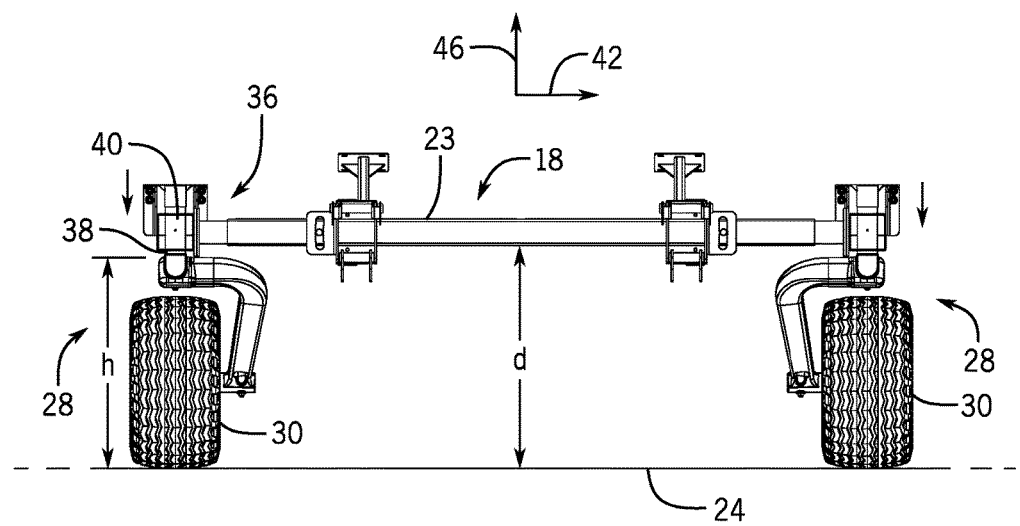
FIG. 6A is a rear view of a lift assist assembly in a vertically retracted configuration, in accordance with an embodiment.

FIG. 6A is a rear view of the lift assist assembly 18 telescoped in a vertically retracted position, in accordance with an embodiment. As depicted, the inner tube 38 is fully retracted vertically into the outer tubes 40 so the distance d between the frame 23 and the field 24 is reduced. The minimum distance between the frame 23 and the field 24 is based on the height h of the rolling element bases 28 and/or the height of the outer tubes 40. The telescoping members 36 may be moved hydraulically (e.g., by the one or more hydraulic cylinders in response to control signals from the controller), pneumatically, or manually, as discussed above. Vertically adjusting the distance of the frame 23 above the field 24 may enable the frame 23 to clear certain objects present on the field, such as crops, rocks, obstacles, or the like. Further, although the telescoping members 36 are shown as using tubing, any suitable members may be used that enable telescopic movement, such as casting, plating, or the like.

Figure 6B:
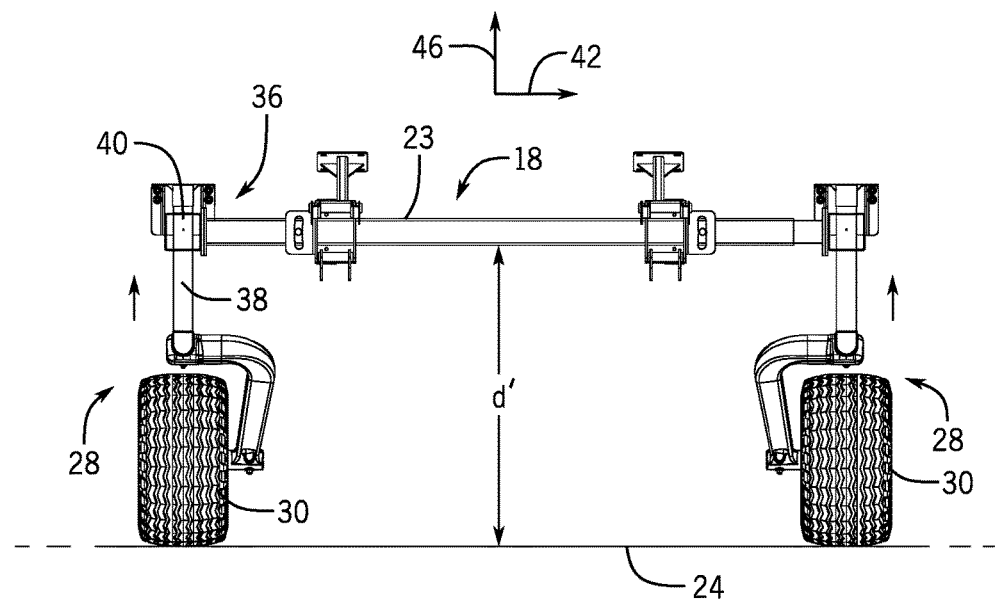
FIG. 6B is a rear view of the lift assist assembly of FIG. 6A in a vertically extended configuration, in accordance with an embodiment.

FIG. 6B is a rear view of the lift assist assembly 18 of FIG. 6A telescoped in a vertically extended position, in accordance with an embodiment. As depicted, the inner tube 38 is extended along the vertical axis 46 relative to the outer tube 38. The telescoping members 36 may be telescoped out hydraulically (e.g., by the one or more hydraulic cylinders in response to control signals from the controller), pneumatically, or manually, as discussed above. As a result, the distance d' between the frame 23 and the field 24 is increased. The maximum distance between the frame 23 and the field 24 is based on the height h of the rolling element bases 28, the height of the outer tubes 40, and the height of the inner tubes 38. It should be noted that although the distance between the rolling element bases 28 is shown as remaining constant between FIGS. 6A and 6B, the distance may be adjusted when using telescoping members 36 that adjust the lift assist assembly 18 in the lateral axis 42 as discussed above with regards to FIGS. 4A and 4B. Further, the distance between the rolling elements 30 and the tool bar 14 may be adjusted in the longitudinal axis 44 using additional telescoping members 36 as discussed above with regards to FIGS. 5A and 5B. Accordingly, it should be understood that the lift assist assembly 18 may include telescoping members 36 that enable movement in the lateral, longitudinal, and vertical axes 42, 44, and 46. As may be appreciated the distance between the frame 23 and the field 24 may be any suitable distance (e.g., from the distance in which the inner tube 38 is fully extended from the outer tube 40 to the distance in which the inner tube 38 is fully retracted in the outer tube 40).

While only certain features of the subject matter have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. An agricultural system, comprising:
a tool bar configured to couple to a tow vehicle, wherein the tool bar is configured to support at least one row unit assembly; and
a lift assist assembly separate from the tow vehicle and coupled to the tool bar such that rotation of the tool bar relative to the lift assist assembly about a vertical axis is blocked, wherein the lift assist assembly is configured to provide lifting support to the tool bar;
wherein the lift assist assembly comprises a frame, a plurality of rolling elements configured to contact a surface of a field, and one or more telescoping members configured to adjust a configuration of the lift assist assembly along a lateral axis; and
wherein the one or more telescoping members are configured to adjust the configuration of the lift assist assembly along the lateral axis by adjusting a width of the frame to vary a lateral separation distance between at least two rolling elements of the plurality of rolling elements.

2. The agricultural system of claim 1, wherein the one or more telescoping members comprise one or more inner tubes disposed within one or more outer tubes.

3. The agricultural system of claim 1, wherein the one or more telescoping members are configured to adjust the configuration of the lift assist assembly along the lateral axis to adjust a lateral position of the lift assist assembly relative to the tool bar while maintaining a width between the at least two rolling elements of the plurality of rolling elements.

4. The agricultural system of claim 1, wherein the one or more telescoping members comprise a plurality of telescoping members, and at least one telescoping member of the plurality of telescoping members is configured to adjust the configuration of the lift assist assembly along a vertical axis by adjusting a vertical distance between the frame of the lift assist assembly and the field.

5. The agricultural system of claim 1, comprising a controller, a valve assembly, and one or more actuating cylinders, wherein the controller is configured to transmit control signals to the valve assembly to control fluid flow to the one or more actuating cylinders, and the one or more actuating cylinders are configured to extend and retract the one or more telescoping members.

6. The agricultural system of claim 1, comprising a controller and one or more actuators, wherein the actuators are configured to drive the one or more telescoping members to extend and retract based on signals from the controller.

7. The agricultural system of claim 1, wherein the frame of the lift assist assembly is configured to support a bulk fill tank, a fertilizer tank, a ballast tank, a chemical tank, or some combination thereof.

8. An agricultural system, comprising:
a tool bar configured to couple to a tow vehicle, wherein the tool bar is configured to support at least one row unit assembly; and
a lift assist assembly separate from the tow vehicle and coupled to the tool bar such that rotation of the tool bar relative to the lift assist assembly about a vertical axis is blocked, wherein the lift assist assembly is configured to provide lifting support to the tool bar, and the lift assist assembly comprises:
a frame;
a plurality of rolling elements; and
one or more telescoping members configured to adjust a width of the lift assist assembly along a lateral axis to vary a lateral separation distance between at least two rolling elements of the plurality of rolling elements, to adjust a lateral position of the lift assist assembly relative to the tool bar to vary a lateral position of at least two rolling elements of the plurality of rolling elements, or some combination thereof, wherein the one or more telescoping members comprise at least one inner tube disposed within at least one outer tube.

9. The agricultural system of claim 8, wherein the lift assist assembly comprises one or more actuators configured to drive the one or more telescoping members to extend and retract based on signals from a controller.

10. The agricultural system of claim 8, wherein the one or more telescoping members comprise a plurality of telescoping members, and at least one telescoping member of the plurality of telescoping members is configured to adjust a vertical distance between the frame of the lift assist assembly and a field.

11. An agricultural system, comprising:
a tool bar configured to couple to a tow vehicle, wherein the tool bar is configured to support at least one row unit assembly; and
a lift assist assembly separate from the tow vehicle and coupled to the tool bar such that rotation of the tool bar relative to the lift assist assembly about a vertical axis is blocked, wherein the lift assist assembly is configured to provide lifting support to the tool bar, and the lift assist assembly comprises:
at least one rolling element base comprising a rolling element and an armature; and
a frame coupled to the at least one rolling element base via the armature, wherein the frame comprises telescoping members configured to adjust the configuration of the frame, the telescoping members comprise at least one inner tube disposed within at least one outer tube that enable adjusting the configuration of the frame, and the telescoping members are configured to adjust a longitudinal position of the rolling element of the at least one rolling element base along a linear path by increasing or decreasing the length of the frame to vary a longitudinal distance between the rolling element of the at least one rolling element base and the tool bar.

12. The agricultural system of claim 11, comprising one or more actuators, wherein the one or more actuators are configured to drive the telescoping members to extend and retract based on signals from a controller.

* * * * *